United States Patent [19]
Paylor

[11] Patent Number: 5,794,644
[45] Date of Patent: *Aug. 18, 1998

[54] ADAPTOR TOOLS AND METHOD TO EXPOSE VALVE

[76] Inventor: Christopher John Paylor, 4225 Hickory Dr., Mississauga, Ontario, Canada, L4W 1L3

[*] Notice: The term of this patent shall not extend beyond the expiration date of Pat. No. 5,746,416.

[21] Appl. No.: 78,927

[22] Filed: Jun. 21, 1993

[51] Int. Cl.[6] .............................. F16K 43/00; F16K 31/44
[52] U.S. Cl. ........................ 137/15; 81/124.2; 81/125; 81/111.85; 134/21; 134/166 C; 137/364; 137/368; 251/292; 403/328; 405/154
[58] Field of Search ................... 137/1, 15, 315, 137/319, 320, 321, 323, 363, 364, 368, 369, 365, 366, 367; 251/291, 292, 297, 293; 81/125, 176.15, 176.2, 176.3, 177.85, 124.2; 15/300.1; 403/327, 328; 405/154; 134/21, 166 R, 166 C

[56] References Cited

U.S. PATENT DOCUMENTS

| | | | |
|---|---|---|---|
| 43,056 | 6/1864 | Weldon | 137/368 |
| 400,944 | 4/1889 | Powell | 251/293 |
| 972,384 | 10/1910 | Kellar et al. | 137/321 |
| 1,759,221 | 5/1930 | Carson | 137/364 |
| 1,827,861 | 10/1931 | Volkhardt | 251/293 |
| 2,184,516 | 12/1939 | Coster | 137/364 |
| 2,497,789 | 2/1950 | Mueller | 81/176.15 |
| 2,827,914 | 3/1958 | Alters | 137/364 |
| 2,851,295 | 9/1958 | Chaffee | 81/177.85 |
| 2,896,985 | 7/1959 | Braatz | 81/177.85 |
| 2,931,383 | 4/1960 | Handley | 137/369 |
| 3,010,694 | 11/1961 | Lynch | 251/291 |
| 3,658,086 | 4/1972 | Hart | 251/291 |
| 3,746,034 | 7/1973 | Cosson | 137/364 |
| 4,420,012 | 12/1983 | Astrom | 137/321 |
| 4,579,476 | 4/1986 | Post | 403/328 |
| 4,643,218 | 2/1987 | Reed, Jr. | 137/364 |
| 4,645,372 | 2/1987 | Suzuki | 403/328 |
| 4,702,275 | 10/1987 | Ballun et al. | 137/369 |
| 4,832,069 | 5/1989 | Gale | 405/154 |
| 4,860,992 | 8/1989 | Aunspach | 251/292 |
| 4,899,780 | 2/1990 | Astrom | 137/321 |
| 5,070,895 | 12/1991 | Kelly | 137/368 |

FOREIGN PATENT DOCUMENTS

| | | | |
|---|---|---|---|
| 2380381 | 9/1978 | France | 137/364 |
| 101409 | 2/1963 | Norway | 137/364 |
| 2205630 | 12/1988 | United Kingdom | 137/364 |

*Primary Examiner*—George L. Walton
*Attorney, Agent, or Firm*—Eugene J. A. Gierczak

[57] ABSTRACT

This invention relates to an adaptor for activating a valve, the adaptor includes a socket at one end thereof to register with the valve, the socket including at least one displaceable engageable ball plunger for gripping the valve when the socket is urged against the valve for operating the valve. The invention also relates to a service box assembly for a water valve disposed in the ground which utilizes the adaptor as well as the method of exposing a water valve to reinstall an inoperable service box rod in a service box assembly having a water valve below ground level. The invention also teaches installation tools to locate and maintain a service box rod within a service box assembly.

21 Claims, 6 Drawing Sheets

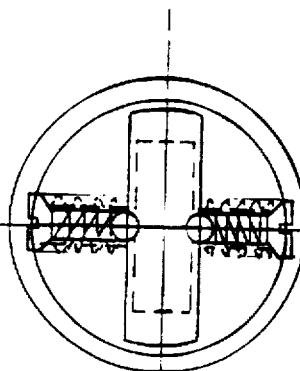
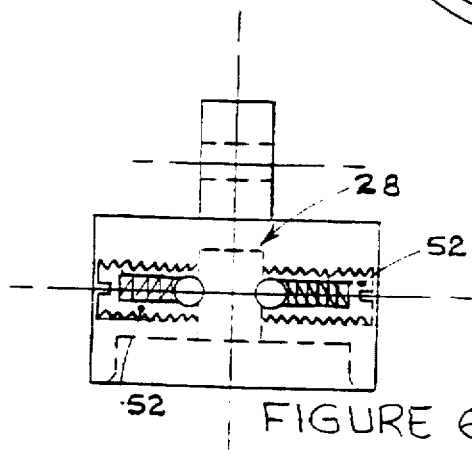
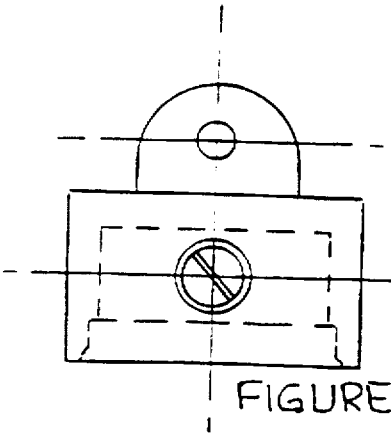
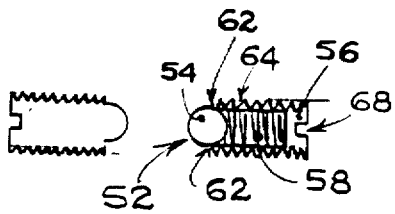
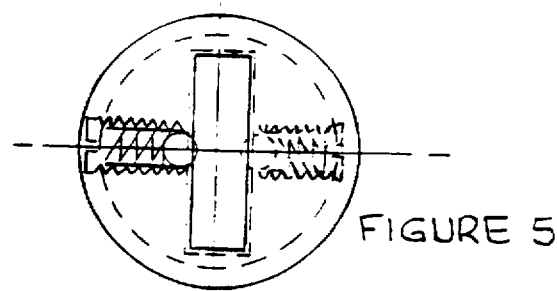
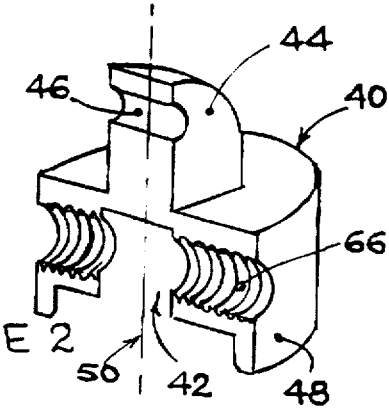
FIGURES 2 to 6

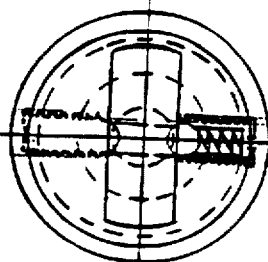
FIGURE 8
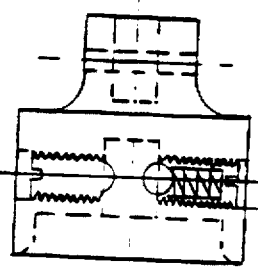
FIGURE 11
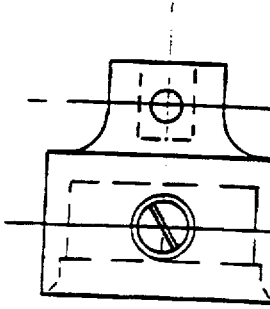
FIGURE 9
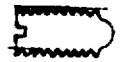 
FIGURE 16
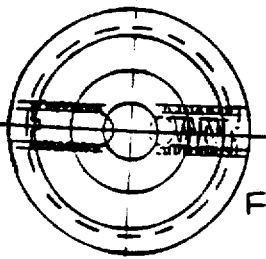
FIGURE 10
FIGURES 7-11 & 16
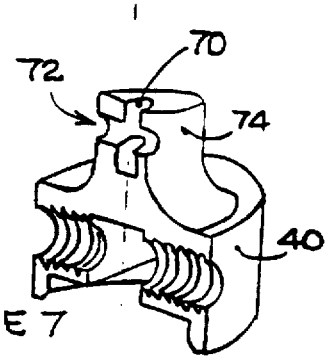
FIGURE 7

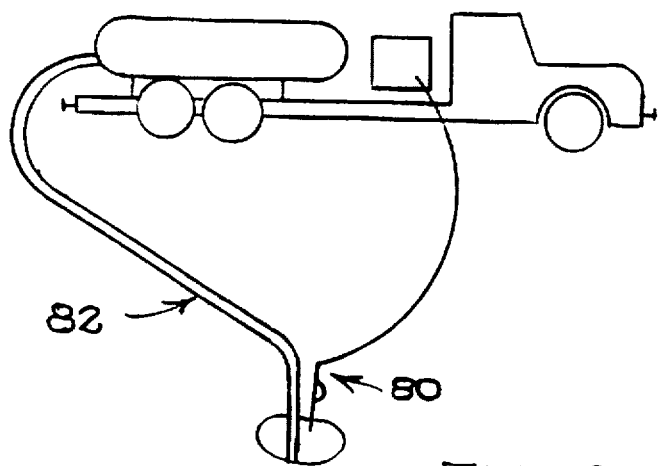
FIGURE 12
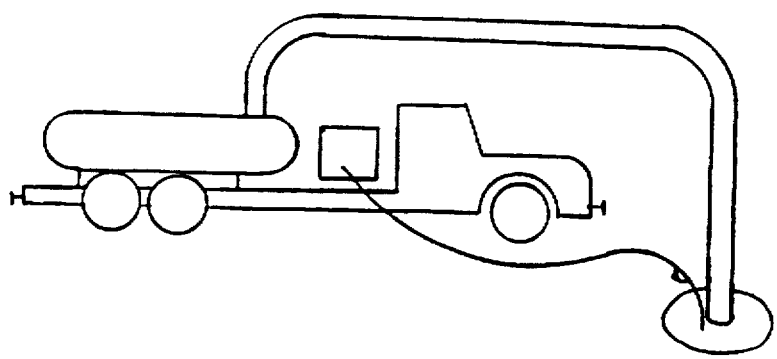
FIGURE 13
FIGURES 12 & 13

ADAPTOR TOOLS AND METHOD TO EXPOSE VALVE

FIELD OF INVENTION

This invention relates to an adaptor for activating a valve, which activator includes a socket having at least one displaceable engageable ball plunger for gripping the valve and particularly relates to a service box assembly for a valve disposed in the ground which utilizes said adaptor. A method of exposing a valve to reinstall an inoperable service box rod in a service box assembly having a valve below ground level is also taught including an installation tool to locate and maintain a service box rod within a service box assembly.

BACKGROUND OF THE INVENTION

Service boxes complete with rods are widely used in the public utility field to provide access or operation to the valve and other control components of conduits and pipelines buried in the ground. For example, U.S. Pat. No. 3,548,864 teaches a curb box and a method for making the same, which is formed of mouldable synthetic material, others are made of iron/steel.

Another arrangement is shown in U.S. Pat. No. 3,746,034 which relates to a curb box which is installed in the ground in valve protecting position and is positioned vertically so that if an upper portion of the box is sheared off or otherwise accidentally removed, the remaining box portion will be detectable because of the presence of a portion of the detectable metallic means.

Yet another arrangement is shown in U.S. Pat. No. 4,643,218 which relates to a cleaner and actuator device for remote access valve controls.

Finally, U.S. Pat. Nos. 43,056 and 380,308 teach a stop cock and case for pipes leading from street mains and a stop cock box respectively.

A common problem which utilities encounter relates to the operation of the control valve, stop cock, curb stop, when the service box rod and/or key becomes disconnected from the valve or shut-off. Traditionally, the method of connecting the service box rod and/or key to the curb stop or valve curb stop or control valve has been by means of a fork or prong that is welded or moulded to the rod and a cotter pin or other similar pin produced from non-corrosive material, such as brass, is used to secure the rod or key to the valve. Very often, the non-corrosive cotter pin or pins is not used or is replaced with a cotter pin or pins that is corrosive. Therefore, the cotter pin or pins corrodes the rod or key, becomes disconnected from the valve, which results in the valve becoming inoperable. Moreover, the cotter pin may also become disconnected or broken through time. Moreover, sometimes the pins are not used to attach the rod and once operated the rod becomes detached from the valve. It is an object of this invention to provide an improved adaptor which can be utilized to quickly and efficiently repair an inoperable connection between the rod or key and valve. It is another object of this invention to provide an alternative to the pin connecting method by utilizing a displaceable engageable member.

It is another object of this invention to provide an improved method for removal of the valve box and rod in order to reconnect the service box rod or key to the valve by utilizing a high pressure water washout and vacuum method.

It is an aspect of this invention to provide an adaptor for activating a valve, said adaptor including a socket at one end thereof to register with the valve, the socket including at least one displaceable engageable member for gripping the valve when the socket is urged against the valve for operating the valve.

It is another aspect of this invention to provide a service box assembly for a valve disposed in the ground said service box assembly including: upper and lower tubular telescopic portions for presenting an access passage from the valve to ground level; a removable cover plate to cover said access passage; an adaptor for activating said valve, said adaptor including a socket at one end thereof to register with the valve, said socket including at least one displaceable engageable member for gripping said valve when said socket is urged against said valve for operating said valve; a service box rod disposed within said access passage and connected to said adaptor for rotating said adaptor and said valve to open said valve in a first position and to close said valve in a second position.

It is yet another aspect of this invention to provide a method of connecting a service box rod to a valve having an operable lug with a depression therein in the ground comprising the steps of: connecting one end of the rod to one end of the adaptor, where the adaptor has a socket at the other end opposite said end connected to the rod, said socket including at least one displaceable engageable member; urging the adaptor over the operable lug of said valve and displacing said engageable members so as to register and lock with said depression of said lug and grip said lug for operating the valve.

It is also another aspect of this invention to provide a method of exposing a valve to reinstall an inoperable service box rod in a service box assembly having a valve below ground comprising the steps of: creating a hole in the ground just sufficient to clear the service box assembly by using a high-pressure water washout and vacuuming the debris until the ground has been excavated around the service box assembly to said valve; removing said service box assembly; removing said service box rods having a fork with apertures at one end thereof; connecting an adaptor having an extension with a hole at one end thereof for alignment with said apertures of said fork and forcing a locking pin through said hole and said apertures, said adaptor including a socket at another end thereof, said socket including at least one displaceable engageable member; reintroducing said service box assembly over said valve; urging said adaptor over said valve and displacing said engageable member with said valve for operating said valve; filling said hole.

It is yet another aspect of this invention to provide an installation tool to locate and maintain a service box rod within the service box assembly comprising: a clamping mechanism for clamping the end of the service box rod; a first pulley connected to the clamping mechanism for releasably clamping the end of the service box rod when the first pulley is activated; and a second pulley connected to the first pulley for activating the first pulley.

DESCRIPTION OF THE DRAWINGS

These and other objects and features of the invention shall now be described in relation to the following drawings:

FIG. 2 is a cross section perspective view of the adaptor.

FIG. 3 is a bottom view of the adaptor.

FIG. 4 is a side elevational view of the adaptor.

FIG. 5 is a top view of the adaptor.

FIG. 6 is a cross-sectional view of the adaptor.

FIG. 7 is a full cross-sectional perspective view of a second embodiment of the adaptor.

FIG. 8 is a bottom view of the adaptor shown in FIG. 7.

FIG. 9 is a side elevational view of the adaptor shown in FIG. 7.

FIG. 10 is a top view of the adaptor shown in FIG. 7.

FIG. 11 is a cross-sectional view of the adaptor shown in FIG. 7.

FIG. 12 illustrates a truck having a high-pressure water line and vacuum hose.

FIG. 13 shows an alternative truck having a high-pressure water line and more powerful vacuum mechanism.

FIG. 16 is a side view of a fixed ball.

DESCRIPTION OF THE INVENTION

Like parts have been given like numbers throughout the figures.

Figure 1:
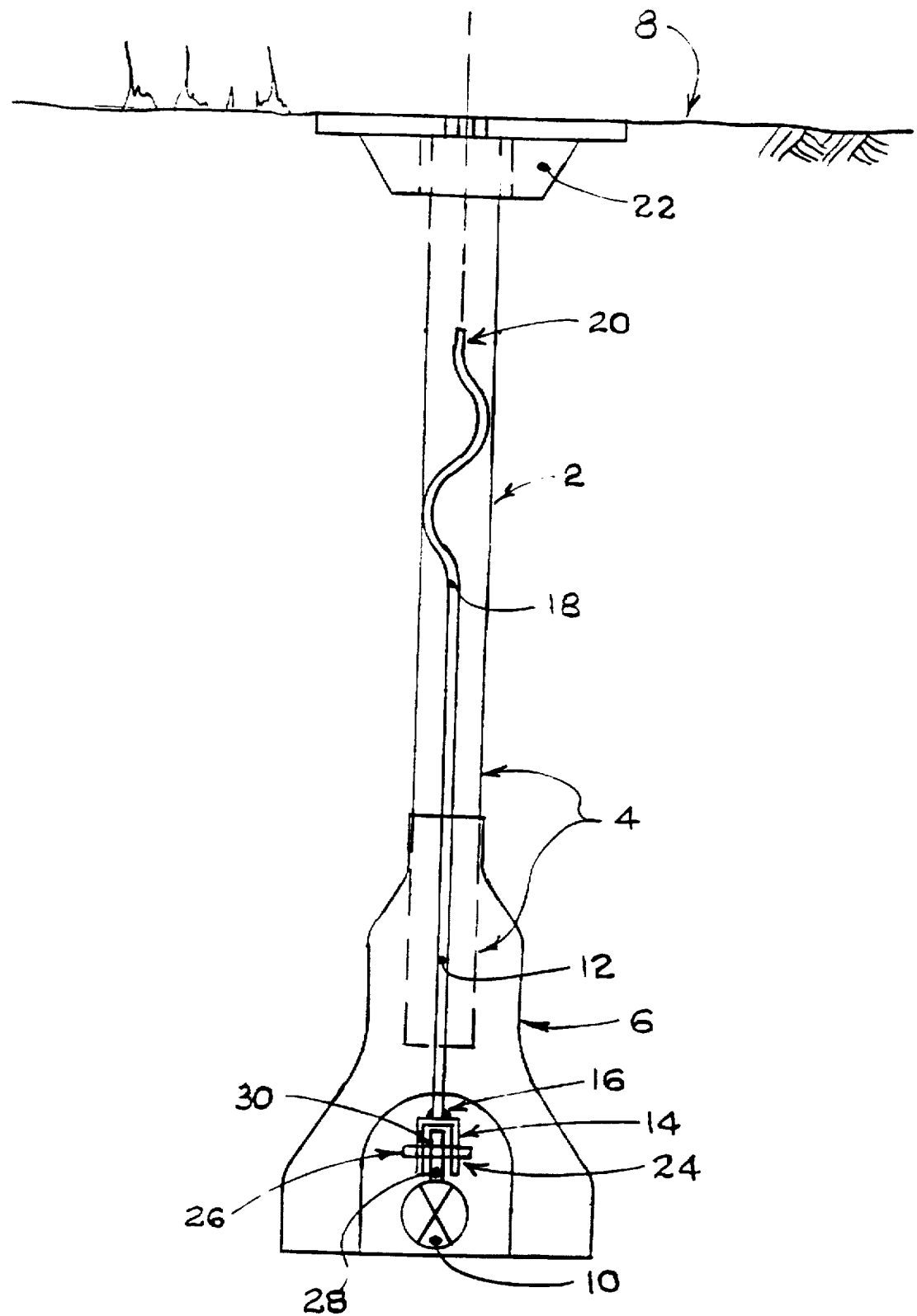
FIG. 1 is a front elevational view of the prior art service box assembly.

FIG. 1 is a drawing of the prior art which shows the utilization of a service box assembly 2 which includes an upper telescoping portion 4 and lower telescoping or dog house 6 which are adapted to slide relative to one another so as to adjust the height of the service box assembly 2 between ground level 8 and the depth of the valve 10. The valve can be anywhere between 8 and 9 feet below ground level or any other depth which is suitable to the particular pipe or conduit. For example, depth of conductor pipe could be between 3 to 12 feet deep.

The common service box assembly 2 also includes a service box rod/key 12 which has a fork/connector 14 at one end 16 thereof and a bent or zig-zag portion 18 at the other end 20 thereof. The zig-zag portion 18 is adapted to generally centre the service box rod/key 12 within the telescoping portion 4.

The service box assembly 2 presents an access passageway between ground level 8 and the valve 10. The top of the service box assembly 2 includes a cover plate 22 which is attached to the service box assembly 2 in a manner well-known to those persons skilled in the art.

A service box rod 12 is generally comprised of stainless steel or other material and is adapted to turn the valve 10 in a manner well-known to those persons skilled in the art. In particular the service box rod 12 includes a fork or prong 14 which is connected to one end 16 of the rod by means of welding or the like. The fork 14 includes two aligned apertures 24 which are adapted to receive a cotter pin or other locking pin 26. In particular, the valve 10 includes an extension or lug 28 having a hole, depression or indent 30 therethrough for aligning with the apertures 24 of the fork 14 so as to receive the cotter pin 26.

Typically the subject supplier incorporates the practice to use a non-corrosive material such as brass/stainless steel to manufacture the cotter pin or other similar pin 26 to connect the rod 12 to the valve 10. During installation of the rod 12, it is not unusual that the currently used brass cotter pin or other similar pin 26 or other non-corrosive material pin is lost or replaced with a pin of material that corrodes such as the common nail/wire. Accordingly, when it becomes necessary to operate the valve 10, the rod 12 becomes inoperable as the pin 26 has corroded or the rod 12 is "off" the valve 10. Accordingly the valve 10 now needs to be excavated to allow it to be exposed and to have the rod 12 reconnected to the valve 10. The valve 10 can be located in the lawn area or a paved driveway and in either situation expensive and extensive digging procedures have heretofore been implemented to fix the inoperable valve 10. Normally a hole large enough to allow a person to make the repair is required in the prior art. Such method is both time consuming and expensive as the excavation is done by hand or by a back hoe which requires appropriate reinforcement to prevent the ground from caving in while it is being repaired.

Furthermore, the property owner typically experiences unwanted property damage which requires clean-up and repair as well as the possibility of extensive re-asphalting of a portion of the driveway in order to clean-up the repair/or landscaping, sod, trees, flowers, etc.

Accordingly, the FIGS. 2–6 illustrate one embodiment of the invention which illustrates an adaptor or coupler 40 which has a socket 42 at one end thereof adapted to register with the lug 28 of a valve 10. Moreover the adaptor includes at the other end thereof, an extension 44 having a hole 46 therethrough.

In particular the adaptor 40 presents a generally cylindrical body member 48 which extends along the axial length thereof so as to define an axis of rotation 50. The hole 46 and extension 44 is disposed radially relative said cylindrical portion 48.

The sockets 42 include at least one displaceable engageable member 52 and in an embodiment shown in FIG. 2 comprises two displaceable engageable members 52. The displaceable engageable members are adapted to grip the valve 10 and particularly the lug 28 when the socket 42 is urged against the valve 10 in a manner to be more fully described herein.

In the embodiment shown in FIGS. 2–6 inclusive, the two displaceable engageable members 52 are displaced opposite one another radially of the axis of rotation 50.

In particular the displaceable engageable members 52 comprise a spherical member or ball 54 and a housing 56 which has a hole or bore 58 therethrough for housing a spring mechanism 60. The spring 60 is inserted into the bore 58 and the ball member 54 pushed into the bore 58 and the open ends 62 are ball-pinned over in a manner well-known to those persons skilled in the art so as to capture the ball member 54. Accordingly, the displaceable engageable member 52 comprises a ball plunger whereby the ball 54 is adapted to be displaced or moveable within the bore 58. The spring 60 urges the ball 54 in a biased position as shown in FIG. 6. The housing 56 includes a threaded exterior 64 for threading the displaceable engageable member 52 in suitable threadable hole 66 by engagement with the slot 68 by means of a screwdriver or the like. Therefore the displaceable engageable members 52 may be threaded into the housing 66 as best seen in FIG. 6.

Although the figures illustrate the use of two displaceable engageable members 52, it should be noted that only one displaceable engageable member 52 is necessary for the operation of the invention as described herein. In other words one displaceable engageable member 52 or ball plunger 52 may be utilized. Alternatively, the second ball 54 may be fixed as shown in FIG. 16.

Accordingly, when it is discovered that a rod 12 is inoperable to operate the valve 10 the rod 12 is required to be removed from the service box assembly 2. Thereafter the extension 44 is designed to fit between the forks 14 of the rod 12 and the apertures 24 of the fork 14 is aligned with the hole 46 of extension 44. Thereafter a suitable non-corrosive cotter pin or other locking pin may be driven through the apertures 24 and hole 46 of the adaptor 48.

Accordingly an adaptor 48 is connected at the other end to the service box rod 12 so as to retrofit an inoperable service box rod. Thereafter any dirt or debris around the valve is removed and the retrofitted service box rod with adaptor 48 placed down over the valve 10 in the manner whereby the socket 42 is urged against the lug 28 whereby the ball(s) 54 of the displaceable engageable members 52 are pushed and forced over the lug so as to register with the hole, depression or indent 30 of the lug 28. In particular, the socket 42 is dimensioned so as to receive the lug 28. Moreover, as the socket 42 is urged over the lug 28, the ball(s) 54 of displaceable engageable members 52 contact the outside edges of lug 28 and upon further urging the ball(s) 54 push against the springs 60 so as to cause the ball(s) 54 to move within the bores 58 and thereby ride over the lug 28 until the ball(s) 54 register with the hole 30. Once the ball(s) 54 register with the hole, depression or indent 30, the ball(s) 54 are pushed by the springs 60 so as to register with the hole 30 and grip the lug 28 as best seen in FIG. 6.

Accordingly, if for some reason the rod 12 must be removed, it may be simply pulled away from the valve 10 for disengagement whereby, again, the ball(s) 54 would move within their respective bores 58 so as to clear the lug 28 and then spring back once the socket cleared the lug 28. By urging the socket against the valve 10 the adaptor is firmly secured to the valve 10 by means of the displaceable engageable members 52 so as to repair the inoperable valve. Moreover it has been found that good positive securement of the adaptor 40 is capable even if the valve 10 is not at a horizontal angle and instead is disposed at an incline from the vertical or horizontal plane.

An alternate embodiment is shown in FIGS. 7-11 inclusive, which include parts which are essentially the same as shown in FIGS. 2-6 except that the adaptor 40 is connected to the rod 12 by means of utilizing a connection with the hole 70 so as to fit within the hole 70 and be secured by the pin. Other methods of connection could include welding, threaded engagement, or other suitable means, for an engagement with a service box rod/key 12 which does not include the fork 14 but rather includes an end which is engageable with the hole 70. In the arrangement shown in FIG. 7 the hole 70 is orientated and disposed along the axis. A locking pin 72 is utilized in extension 74 as shown in FIG. 7. In one arrangement the diameter of one end of the rod is dimensioned so as to fit within the hole 70 and be secured by the pin.

The adaptor 40 shown in FIG. 7 may be utilized as a new part to be included in a service box assembly whereby the rod 12 is connected to the adaptor 40 so as to be placed in new installation or alternatively, the embodiment shown in FIG. 7 may be utilized to retrofit or repair inoperable valves. However, it should be noted that the adaptor 40 shown in FIGS. 2-6 has been designed so as to enable a person to retrofit a service box rod while the adaptor shown in FIG. 7 may be utilized during the manufacture of new rods connected to the adaptor 40.

FIG. 12 illustrates a method of exposing a valve to reinstall an inoperable service box rod in a service box assembly having a valve below ground level.

Under the old method it was necessary to excavate around the service box which required digging of a huge hole. In the embodiment shown in FIG. 12, it is only necessary to dig a round hole sufficiently large enough to clear the service box.

Figure 15:
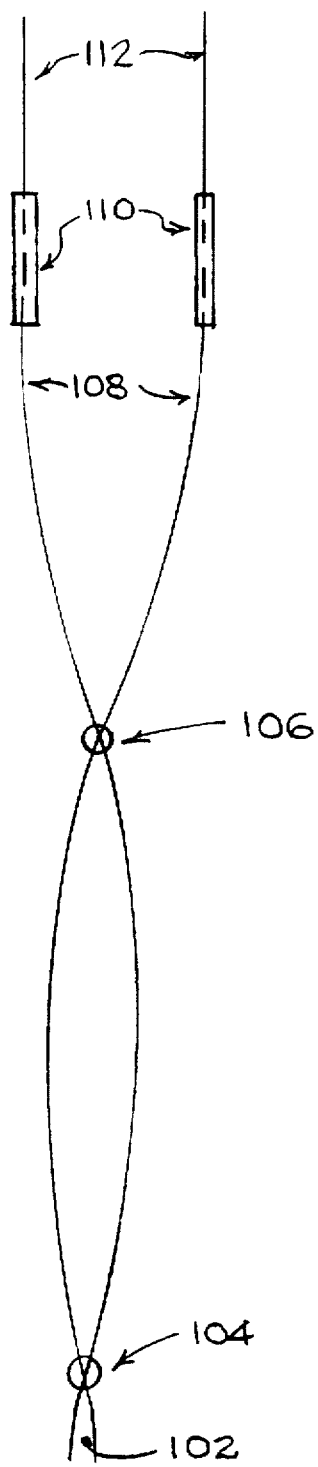
FIG. 15 illustrates a tool to cut and/or remove a cotter pin, clip or wire from the stop cock, control valve, curb stop or valve.

Typically, a hole of approximately 12 inches in diameter would be sufficient. Accordingly, in the embodiment shown in FIG. 12 a pick (not shown) may be utilized to cut through the top layer of asphalt in a driveway or the like and thereafter a high pressure water wash-out tool 80 may be utilized which has sufficient force to "cut" or push gravel, dirt or the like from around the service box assembly 2. Thereafter a vacuum hose 82 may be utilized to vacuum up the loose debris which has been loosened by the high pressure water wash-out 80. This operation is continued until the dirt around the service box assembly 2 has been removed down to the valve 10. Thereafter the service box assembly 2 can be removed so as expose the valve 10. The rod 12 is also removed in the manner well-known to those persons skilled in the art. If the cotter pin 26 has been corroded or not used, the rod 12 may be easily removed. If however a portion of the cotter pin 26 is still intact or if the rod 12 is still partially or fully connected to the valve 10, a suitable tool (as shown in FIG. 15) to remove the pin 26 may be utilized so as to disengage or dislodge the rod 12 from the valve 10. Thereafter the rod 12 as shown in FIG. 2 having the fork 14 may be utilized to connect to the adaptor shown in FIG. 1 as described above. The rod 12 may then be lowered into the service box assembly 2 such that the adaptor 40 registered as over the valve 10 and rod/key and in particular the socket 42 is urged against the lug 28 in a manner described above whereby the displaceable engageable means 52 register with the valve 10 as described above. The service box assembly 2 may then be lowered over the rod 12 and over the valve 10 in a manner well known to those persons skilled in the art.

Figure 14:
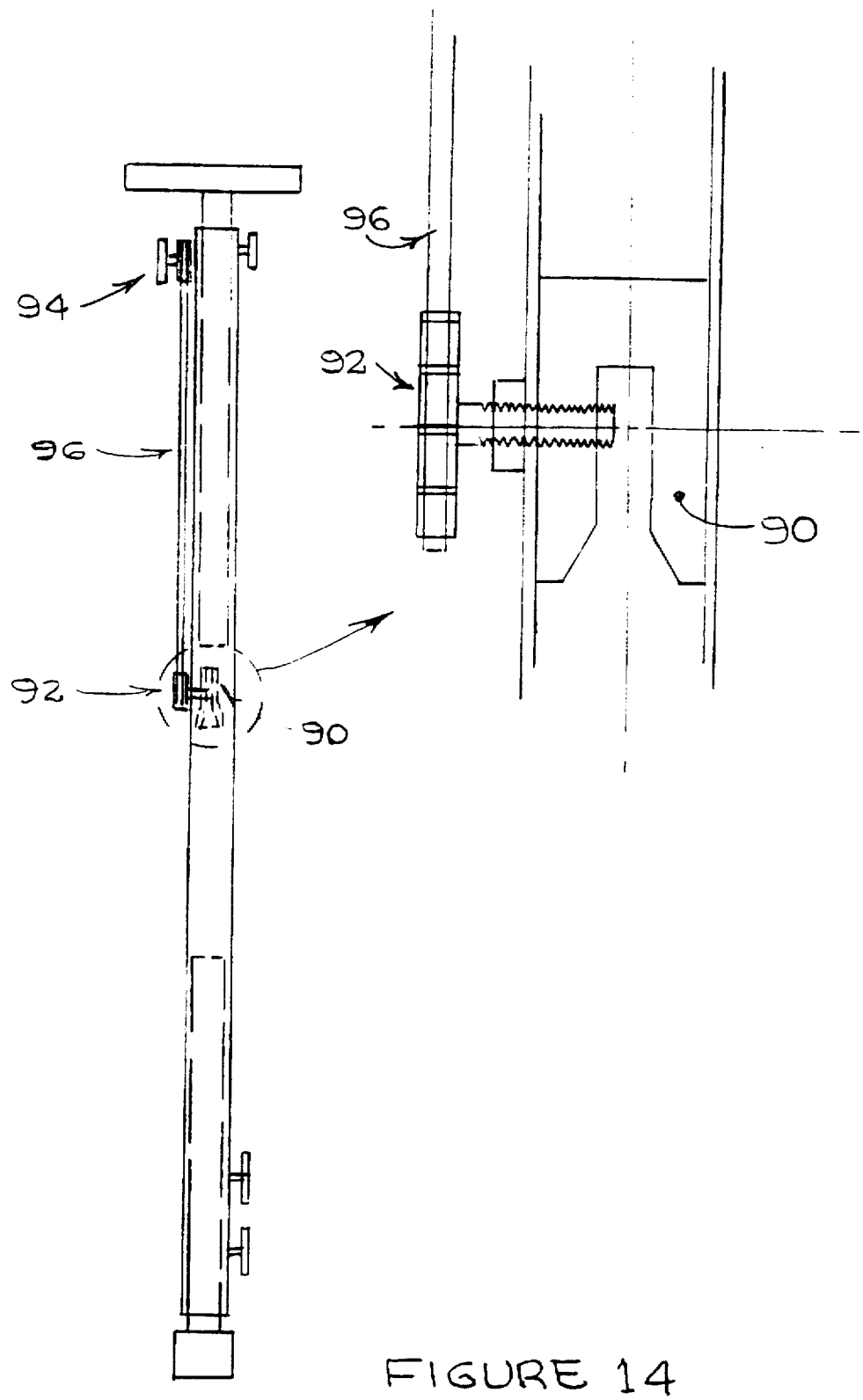
FIG. 14 illustrates an installation tool for installing the rod/key complete with adaptor attached.

Alternatively, the installation tool as shown in FIG. 14 may be utilized should the valve 10 be too deep to connect the rod/key 12 to the valve 10.

The installation tool as shown in FIG. 14 includes a clamping mechanism 90 which is connected to a first pulley assembly 92 adapted to activate the clamping mechanism 90 so as to clamp the end 20 of the rod 12 to fixedly secure same. A second pulley assembly 94 may be utilized which is connected to the first pulley assembly 92 by means of a pulley chain or the like 96. In particular the second pulley assembly 94 is activated so as to turn first pulley assembly 92 by means of the chain 96 so as to clamp the end 20 of the rod 12. The insertion tool is then inserted into the access passage defined by the service box assembly 2 so that the adaptor 40 can engage in the valve 10 as described above. Once the engagement has taken place, the second pulley assembly 94 is deactivated so as to cause the first pulley assembly 92 to move and unclamp the clamping mechanism 90 from the end of the rod 12. Thereafter the insertion tool may be removed from the ground and the curb box/valve box 4 placed over the rod/key 12. Thereafter the hole around the service box assembly 2 may be filled in. If the small twelve inch diameter hole is located in the driveway only a small portion of asphalt will be necessary to repair the excavation, likewise if in a lawn area, only a small portion of sod will be necessary to repair the excavation.

FIG. 15 illustrates a tool 100 which includes a wire cutter portion 102 and wire cutter pivot point 104, and second pivot point 106, with handles 108. The handles include adjustable extending sleeves 110 which may be utilized to extend the length of the handles 108 by moving handle portions 112 within the extending sleeve 110.

By utilizing the invention described herein an inoperable service box rod may be quickly, efficiently and cost-effectively repaired with minimal damage to the property or the owner.

Furthermore by utilizing the high pressure water and vacuum method, repair or excavating may take place by means of a "no dig"/"trenchless" excavating method.

Although the preferred embodiments as well as the operations and use have been specifically described in relation to the drawings it should be understood that variations to the preferred embodiments could easily be achieved by a person skilled in the arts without departing from the spirit of the invention. Accordingly the invention should not be understood to be limited to the exact form revealed by the drawings. For example the drawings refer to a water valve, although the invention extends to other valves such as gas, oil, or any other valve for fluid, gas or liquids.

The embodiments of the invention in which an exclusive property or privilege is claimed are defined as follows:

1. An adaptor for connecting a rod and a valve disposed below ground level, said adaptor including a body member extending along an axial length thereof for defining an axis of rotation, said body member including a socket at one end thereof to register with said valve, said body member including at least one radially disposed threaded hole opening into said socket, said threaded hole for threadably receiving a displaceable engageable member having a spherical member moveable radially within said radially disposed threaded bole as to:

(i) move said spherical member radially into said socket and grin and lock said adaptor to said valve for axial rotation of said valve solely by urging said socket against the valve;
   (ii) move radially away from said socket and valve and release said adaptor from said valve by solely pulling said socket away from said valve and means at another end of said adaptor for connection to said rod.

2. An adaptor as claimed in claim 1 wherein said displaceable engageable member includes a displaceable spherical member.

3. An adaptor as claimed in claim 1 wherein said displaceable engageable member comprises a ball and a spring means for urging said ball against said valve to grip said valve when said socket is urged against said valve and for permitting said ball to move relative said spring and said valve when said socket is removed from said valve.

4. An adaptor as claimed in claim 3 wherein said rod includes a first end and said connecting means comprises a hole disposed at said other end of said adaptor for receiving said first end of said rod whereby said one end of said rod is press fit with said hole disposed at said other end of said adaptor and said rod includes an end for connection to said hole.

5. An adaptor as claimed in claim 4 further including a locking pin for locking said rod to said press fit hole of said adaptor.

6. An adaptor as claimed in claim 4 wherein said connecting means includes a hole and said rod includes aperture means at one end of the said rod for alignment with said hole, and a locking pin traversing said hole and said aperture means for locking said rod to said adaptor.

7. An adaptor as claimed in claim 6 wherein said aperture means is presented by a fork at said one end of said rod.

8. An adaptor as claimed in claim 4 wherein said adaptor presents a generally cylindrical body section extending along an axial length thereof and defining an axis of rotation, said socket presented at one axial end thereof, and said connecting means presented at another opposite axial end thereof.

9. An adaptor as claimed in claim 8 wherein said ball and spring means are disposed radially relative said body section.

10. A service box assembly for a valve with a lug having a transverse through hole, said valve disposed in the ground, said box assembly comprising:

(a) upper and lower tubular telescopic portions for presenting an access passage from said valve to ground level;
   (b) a removable cover plate to cover said access passage;
   (c) an adaptor for activating said valve, said adaptor including a body member extending along an axial length thereof defining an axis of rotation, a socket presented at one end of said body member to register with said valve, said body member including two opposite radially disposed threaded holes opening into said socket, each said threaded hole for threadably receiving a displaceable engageable member;
   (d) a first spherical member carried by one of said displaceable engageable members, said first spherical member projecting radially inwardly into said socket;
   (e) a second spherical member carried by said other displaceable engageable member, said second spherical member disposed radially opposite said first spherical member and projecting radially inwardly into said socket;
   (f) said first spherical member and said second spherical member moveable radially within said radially disposed threaded holes so as to:
      (i) move radially into said socket and grip opposite ends of said through hole and lock said adaptor to said valve for axial rotation of said value solely by urging said socket against said valve;
      (ii) and to move radially away from said socket and release said adaptor from said valve by solely pulling said socket away from said valve;
   (g) a service box rod disposed within said access package and connected to another end of said body member for rotating said body section and said valve about said axis of rotation to open said valve in a first position and to close said valve in a second position.

11. In a service box assembly as claimed in claim 10 wherein said rod includes a fork at one end thereof presenting apertures therethrough and said cylindrical body section includes an extension at said other end thereof presenting a hole disposed radially relative said body section, for alignment with said apertures presented by said fork, and a locking pin extending through said hole and through said apertures.

12. In a service box assembly as claimed in claim 10 wherein said rod includes an end and said cylindrical body includes a hole at said other end for connection with said end of said rod.

13. A method of repairing an inoperable connection between a service box rod and a valve located in the ground, having a lug with a transverse through hole comprising the steps of:

(a) interposing an adaptor between said rod and said valve said adaptor having a body member extending along an axial length thereof for defining an axis of rotation
      (i) connecting one end of said rod to one axial end of said body member of said adaptor where said body member of said adaptor has a socket at an axial end opposite said end connected to said rod, said body member including at least one radially disposed threaded hole opening into said socket, said threaded hole for threadably receiving a displaceable engageable member extending into said socket;
      (ii) moving at least one spherical member carried by said displaceable engageable member radially within said radially disposed threaded hole so as to:

(A) move said spherical member radially into said socket and grip opposite ends of said through hole and lock said adaptor to said valve for axial rotation of said valve solely by urging said socket against said valve and to
(B) move said spherical member radially away from said socket and release said adaptor from said valve by solely pulling said socket away from said valve.

14. A method as claimed in claim 13 wherein said valve is disposed in the ground, including the step of creating a hole in the said ground to said valve, followed by said connecting step and then placing said connector rod and adaptor into said hole for releasably securing said adaptor to said lug.

15. In a method as claimed in claim 14 wherein said method of connecting one end of said rod to said one end of said adaptor comprises the step of press fitting one end of said rod into a hole presented at said one end of said adaptor.

16. In a method as claimed in claim 14 wherein said one end of said rod includes a fork presenting aperture means therethrough and said adaptor includes an extension at one end thereof including a hole therethrough, and said method of connecting said rod to said adaptor comprises the steps of:
(a) placing said extension between said fork and aligning said hole of said extension with said aperture means of said fork;
(b) placing a locking pin through said hole and said aperture means to lock said roll to said adaptor.

17. In a method as claimed in claim 14 wherein said ground hole is created by utilizing a high pressure excavating means.

18. A method of repairing an inoperable service box rod in a service box assembly having a valve below the ground by utilizing an adaptor said method comprising the steps of:
(a) excavating dirt around said service box assembly to form an excavated hole in the ground exteriorally of said service box assembly by using a high-pressure water wash so as to break up said dirt and vacuuming said dirt until said dirt has been removed around said service box assembly to said water valve so as to permit access to said valve in said ground;
(b) removing said service box assembly from said excavated hole;
(c) removing said inoperable service box rod from said valve located in said ground, said inoperable service box rod having a fork with aperture means at one end thereof;
(d) connecting said adaptor having a body member extending along an axial length thereof for defining an axis of rotation to said service box rod, said body member having an extension with a hole at one axial end thereof for alignment with said apertures of said fork, and forcing a locking pin through said hole and said apertures, said body member of said adaptor including a socket at another axial end thereof, said body member including at least one radially disposed threaded hole opening into said socket for threadably receiving a displaceable engageable member; said displaceable member carrying a spherical member radially moveable within said threaded hole.
(e) placing said repaired service box rod connected to said adaptor into said excavated hole and urging said adaptor over said valve so as to move said spherical member radially within said radially disposed threaded hole so as to:
(i) move said spherical member radially into said socket and grip and lock said valve for axial rotation of said valve solely by urging said socket against said valve and to
(ii) move said spherical member radially away from said socket and release said adaptor from said valve by solely pulling said socket away from said valve; and
(f) reintroducing said service box assembly into said excavated bole over said rod and water valve;
(g) refilling said excavated hole with dirt around said service box assembly.

19. A method as claimed in claim 18 further including the steps of:
(a) placing the service box rod within said service box assembly prior to reintroducing said service box assembly over said water valve; and
(b) maintaining said service box rod in a fixed position with said service box rod by utilizing an installation tool.

20. In a method as claimed in claim 19 further including the step of utilizing an installation tool to locate said service box rod within said service box assembly.

21. An adaptor for activating a valve having a lug with a transverse through hole, said adaptor having a body member extending along the length thereof to define an axis of rotation;
a socket presented at one axial end of said body member to register with said valve said body member including two opposite radially disposed threaded holes opening into said socket, each said threaded hole for threadably receiving a displaceable engageable member;
a first spherical member carried by one said displaceable engageable member, said first spherical member projecting radially inwardly into said socket;
a second spherical member carried said other displaceable engageable member, said second spherical member disposed radially opposite said first spherical member;
said first spherical member and said second spherical moveable radially within said radially disposed threaded hole so as to:
(i) move said spherical member radially into said socket and grip appropriate ends of said through hole and lock said adaptor to said valve for axial rotation of sad valve by solely urging said socket against said valve and to
(ii) move said spherical member radially away from said socket and release said adaptor from said valve by solely pulling said socket away from said valve.

* * * * *